No. 786,351. PATENTED APR. 4, 1905.
M. FOERG & J. E. HALL.
CANNING MACHINE.
APPLICATION FILED JULY 30, 1904.

2 SHEETS—SHEET 1.

WITNESSES.

INVENTORS.

No. 786,351. PATENTED APR. 4, 1905.
M. FOERG & J. E. HALL.
CANNING MACHINE.
APPLICATION FILED JULY 30, 1904.
2 SHEETS—SHEET 2.
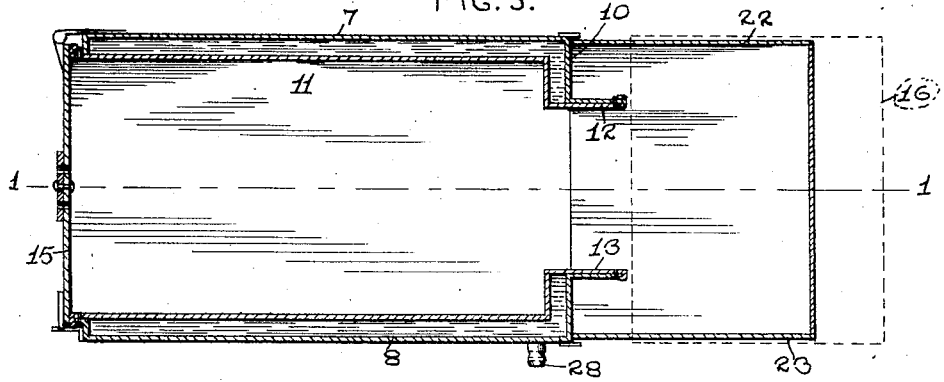
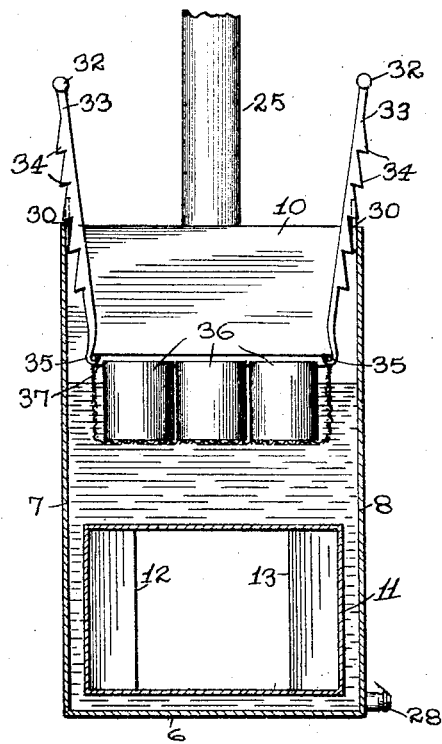
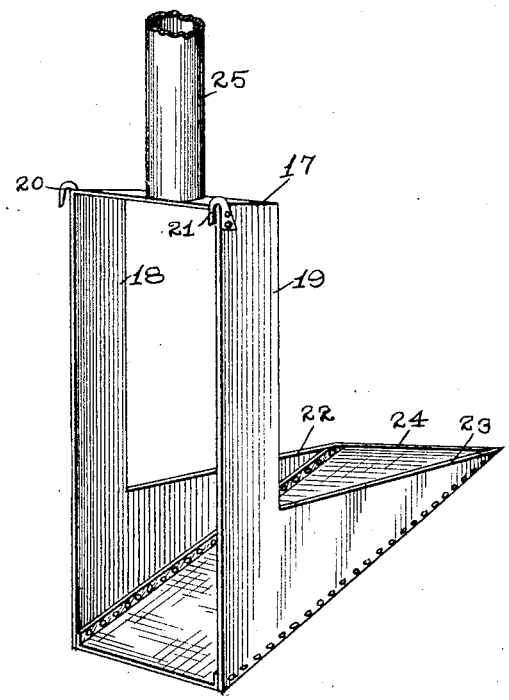
WITNESSES.
H. G. Fletcher.
W. P. Anderson.
INVENTORS.
M. Foerg.
J. E. Hall.
BY Semer & Wells, Atty.

No. 786,351.

Patented April 4, 1905.

UNITED STATES PATENT OFFICE.

MATHIAS FOERG AND JOEL E. HALL, OF MERIDIAN, MISSISSIPPI.

CANNING-MACHINE.

SPECIFICATION forming part of Letters Patent No. 786,351, dated April 4, 1905.

Application filed July 30, 1904. Serial No. 218,951.

*To all whom it may concern:*

Be it known that we, MATHIAS FOERG and JOEL E. HALL, citizens of the United States, residing at Meridian, State of Mississippi, have invented a new and useful Canning-Machine, of which the following is a specification.

Our invention relates to improvements in canners; and it consists in the novel features herein shown, described, and claimed.

Figure 1:
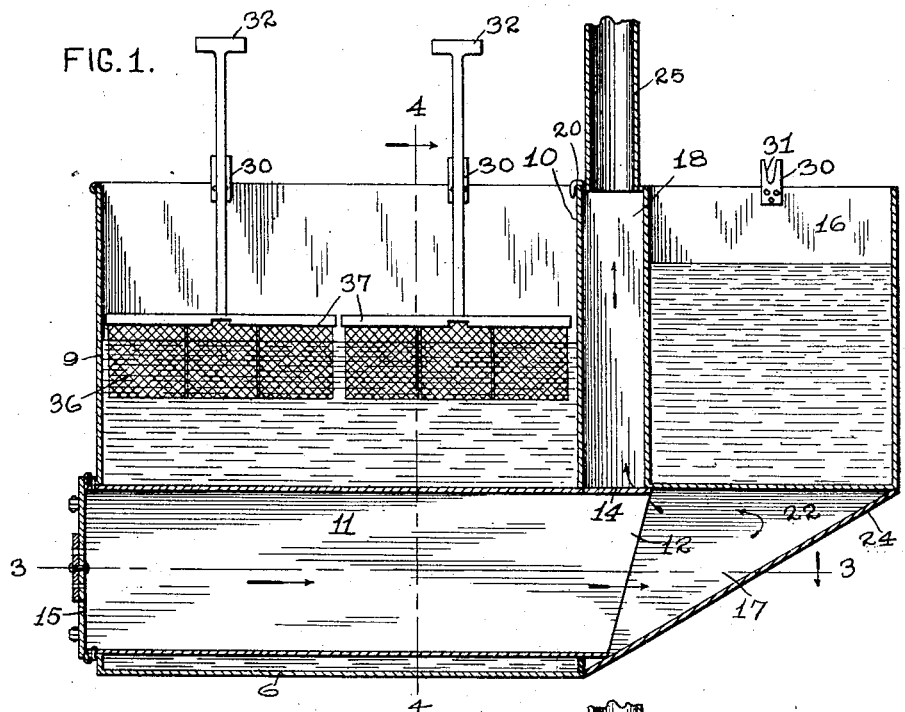
Figure 2:
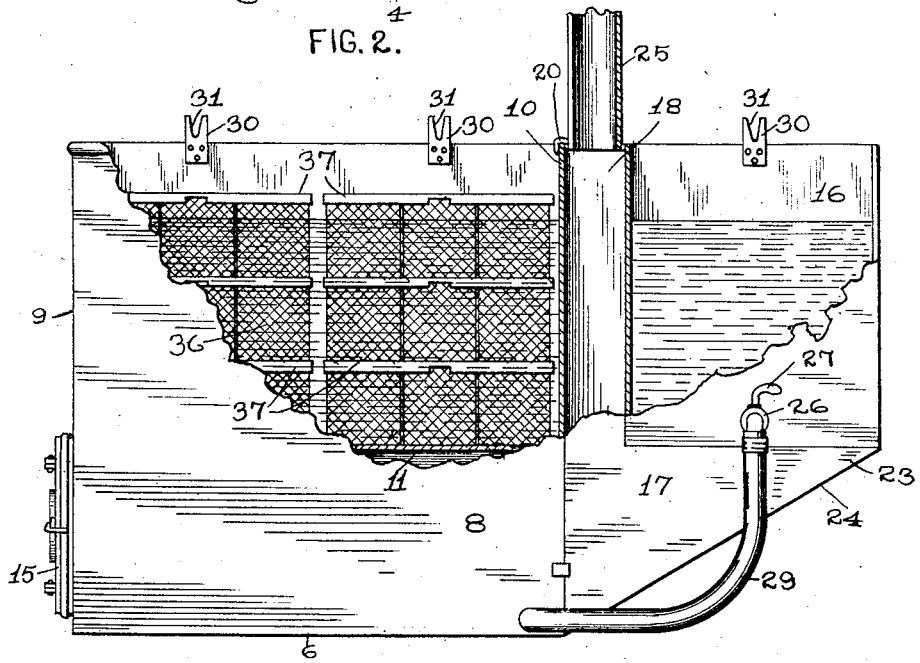

In the drawings, Figure 1 is a vertical central section taken substantially on the line 1 1 of Fig. 3. Fig. 2 is a side elevation on a plane parallel with Fig. 1, parts being shown in section to illustrate the construction. Fig. 3 is a horizontal section taken substantially on the line 3 3 of Fig. 1 and looking downwardly. Fig. 4 is a vertical cross-section taken substantially on the line 4 4 of Fig. 1 and looking in the direction indicated by the arrow. Fig. 5 is a perspective of the scalding-tank support and smoke-stack.

Referring to the drawings in detail, the boiler, comprises the bottom 6, the sides 7 and 8, the front end 9, and the rear end 10 in the form of a rectangular box open at the top.

The fire-box 11 is rectangular in cross-section and is mounted in the lower part of the boiler, with the ends of the fire-box extending through the ends 9 and 10 of the boiler. The rear end of the fire-box extends some distance beyond the end 10 of the boiler, thereby forming the side baffle-plates 12 and 13 and the upper baffle-plate 14, and the forward end of the fire-box is closed by the door 15. The rear end of the fire-box is open.

The scalding-tank 16 is simply a rectangular box open at the top. The scalding-tank support comprises the smoke-stack base 17; the sides 18 and 19, extending downwardly from the smoke-stack base; the hooks 20 and 21, attached to the sides 18 and 19 to hook over the upper edge of the rear end 10; the brackets 22 and 23, extending backwardly from the lower end of the side pieces 18 and 19, the upper edges of the said brackets being level to receive the scalding-tank, and the inclined fire-wall 24, connecting the lower edges of the brackets. The sides 18 and 19 are slightly closer together than the sides 7 and 8, so that the forward edges of the said sides 18 and 19 will fit against the rear end 10 and form a close joint, as shown in Fig. 3. The scalding-tank rests against the rear edges of the sides 18 and 19, thereby completely inclosing the space between the said sides 18 and 19, the said scalding-tank being wider than the brackets 22 and 23, so as to be supported by the said brackets.

A smoke-stack 25 extends upwardly from the base 17. A nipple 26, containing a faucet 27, extends outwardly from one end of the scalding-tank. A nipple 28 extends outwardly from one side of the boiler, and a pipe 29 connects said nipples, so as to run water from the scalding-tank into the boiler.

Ears 30 are secured to the sides 7 and 8, there being V-shaped notches 31 in said ears and the ears being oppositely arranged in pairs. Similar ears are attached to the ends of the scalding-tank. The basket-adjusters each consist of a handle 32, a bar 33, extending downwardly from the handle, teeth 34, extending from the bar 33, and a hook 35 at the lower end of the bar. The bar 33 operates in the V-shaped notches 31, and the teeth 34 engage the ears 30, so that the bars may be adjusted up or down by moving from one tooth to another. The notches in the ears serve as bearings to hold the bars from tipping and from lateral motion.

In operation the boiler is filled with water to a point a short distance above the fire-box and the scalding-tank is filled nearly to the top. Then a fire is started in the fire-box, and the smoke and flame pass backwardly around the baffle-plates 12, 13, and 14 and under the scalding-tank, then upwardly between the scalding-tank and the boiler, between the sides 18 and 19, and then up the flue 25. The cans 36 containing the fruit are placed in the baskets 37, and the hooks 35 are inserted in position to engage and support the baskets. The handles 32 are manually grasped and the baskets lowered into the boiler. By means of the teeth 34 engaging the ears 30 the baskets may be adjusted up or down in the boiler to any desired point.

It is thought to be unnecessary to go into the details of the canning process. If desired, the baskets may be first immersed in the scalding-tank to expel the air, then the covers applied to the cans, and they may be stacked up in the boiler, as shown in Fig. 2, and cooked to any desired extent. When desired, water may be allowed to run from the scalding-tank into the boiler by operating the faucet 27.

We desire to call especial attention to the canner in three pieces. For packing and shipping, the scalding-tank may be placed in the boiler and the scalding-tank support may be placed in the scalding-tank.

We claim—

1. In a canner: the boiler comprising the bottom 6, the sides 7 and 8, the front end 9, and the rear end 10, the fire-box 11 mounted in the boiler with its ends extending through the ends 9 and 10; and with the rear end of the fire-box extending beyond the end 10 thereby forming the side baffle-plates 12 and 13 and the upper baffle-plate 14; the scalding-tank support comprising the smoke-stack base 17, the sides 18 and 19 extending downwardly from the smoke-stack base; the hooks 20 and 21 attached to the sides to hook over the rear end 10; the brackets 22 and 23 extending backwardly from the lower ends of the side pieces; and means of connecting the lower edges of the brackets; and the scalding-tank removably mounted upon the brackets.

2. In a canner: the boiler comprising the bottom 6; the sides 7 and 8, the front end 9, and the rear end 10; the fire-box 11 mounted in the boiler with its ends extending through the ends 9 and 10; and with the rear end of the fire-box extending beyond the end 10 thereby forming the side baffle-plates 12 and 13 and the upper baffle-plate 14; the scalding-tank support comprising the smoke-stack base 17; the sides 18 and 19 extending downwardly from the smoke-stack base; the hooks 20 and 21 attached to the sides to hook over the rear end 10, the brackets 22 and 23 extending backwardly from the lower ends of the side pieces; and means of connecting the lower edges of the brackets; the scalding-tank removably mounted upon the brackets; and the pipe 29 connecting the scalding-tank to the boiler.

MATHIAS FOERG.
JOEL E. HALL.

Witnesses:
J. A. RHODES,
B. H. RHODES.